United States Patent [19]

Long

[11] 4,004,766
[45] Jan. 25, 1977

[54] ISOLATION CLAMP FOR TRANSMISSION TUBE

[76] Inventor: William W. Long, 7501 W. 61st No. 134, Overland Park, Kans. 66202

[22] Filed: Oct. 28, 1975

[21] Appl. No.: 626,118

[52] U.S. Cl. .............................. 248/55; 248/70; 248/74 R

[51] Int. Cl.² .......................................... F16L 3/16

[58] Field of Search ........... 138/106, 107; 248/22, 248/23, 49, 54, 55, 58, 59, 60, 62, 63, 65, 68 R, 68 CB, 70, 71, 72, 73, 74 R; 308/6 B

[56] References Cited

UNITED STATES PATENTS

| 258,638 | 5/1882 | Ford | 248/59 |
|---|---|---|---|
| 1,878,100 | 9/1932 | Bossert | 248/68 R UX |
| 2,021,370 | 11/1935 | Mallay | 248/54 R |
| 2,550,001 | 4/1951 | Button | 248/70 X |
| 2,918,239 | 12/1959 | Wirth | 248/55 |
| 3,110,465 | 11/1963 | Sugarman et al. | 248/74 B |
| 3,128,073 | 4/1964 | Berlyn | 248/55 |
| 3,298,644 | 1/1967 | Sherburne | 248/55 |
| 3,357,664 | 12/1967 | Geyer | 248/74 R |
| 3,390,854 | 7/1968 | Sherburne | 248/55 |
| 3,397,856 | 8/1968 | Sullivan et al. | 248/22 |

FOREIGN PATENTS OR APPLICATIONS

| 1,538,509 | 7/1968 | France | 248/58 |
|---|---|---|---|
| 1,578,116 | 8/1969 | France | 248/68 R |
| 541,520 | 4/1956 | Italy | 248/55 |
| 7,350 | 5/1884 | United Kingdom | 248/74 R |
| 827,170 | 2/1960 | United Kingdom | 248/70 |
| 1,111,158 | 4/1968 | United Kingdom | 248/73 |

Primary Examiner—Lawrence J. Staab
Attorney, Agent, or Firm—H. Kenneth Johnston, II; Thomas C. Naber

[57] ABSTRACT

A vibration absorbing transmission tube isolation clamp which effectuates reduction of transmittance upon structures in communication with a tube being held by the clamp of side to side forces generated by thermal expansion of the tube as the tube transmits liquid under pressure. The clamp comprises a bottom piece securable to a support structure and a top piece securable to the bottom piece with the tube positioned between the two pieces which are shaped so that when secured together a tube housing results which totally surrounds the tube for the length of the clamp. The base of the bottom piece is provided with two or more elongated openings whose long axes are at right angles to and lateral to the longitudinal axis of the tube housing. In operation a bolt is passed through each elongated opening and further passed through a pre-positioned opening in the support structure to thereafter be secured to hold the bottom piece to the support structure while yet permitting side to side movement of the bottom piece on each shaft of each respective bolt within the limits of the elongated openings, thereby permitting side to side movement and thus reduction of transmittance to communicating structures of side to side forces due to thermal expansion of the tube held by the clamp while the tube transmits liquid. The underside of the base of the bottom piece is provided with a low coefficient of friction material so that side to side movement of the interfacing surfaces of the base and support structure is not impeded. Within the tube housing totally surrounding the tube is a vibration absorbing low coefficient of friction material to respectively absorb tube vibration and permit within the tube housing longitudinal movement of the operating tube.

5 Claims, 3 Drawing Figures

ISOLATION CLAMP FOR TRANSMISSION TUBE

BACKGROUND OF THE INVENTION

In many industrial operations it is necessary to transmit large volumes of liquid from one location to another. To accomplish this task it is generally expedient to utilize a rigid-walled transmission tube and transmit under pressure the liquid through the tube. Such a tube should be stably secured to a support structure such as a steel beam of a building wherein the tube is situated. To attain such stable securement, multiple vibration absorbing isolation clamps must generally be utilized. The isolation clamps previously known in the art provide securement to the support structure, diminish vibration transmittance to the support structure, and may substantially satisfy longitudinal forces generated by thermal expansion of the tube. However, these clamps do not effectuate reduction upon structures in communication with the tube of side to side forces generated by thermal expansion of the tube as the tube heats due to transmission therein of liquid. Such side to side forces are therefore transmitted to those structures such as compressors in communication with the tube and can cause damage to said structures, and, if of great enough magnitude, can cause misalignment of the tube or rupture of the tube.

The vibration absorbing transmission tube isolation clamp disclosed herein, while also utilizing vibration absorbing material and also substantially satisfying longitudinal forces generated by thermal expansion of the tube, additionally effectuates reduction of transmittance of side to side forces generated by thermal expansion of the tube by permitting the tube being secured to move from side to side within limits defined by elongated openings which permit side to side movement of the clamp itself on the shafts of bolts holding the clamp to the support structure. Such movement thereby reduces the transmittance of side to side forces upon structures in communication with the tube by substantially satisfying these forces at the clamp site instead of transmitting these forces to the site of the communicating structures.

SUMMARY OF THE INVENTION

The subject of this invention is a vibration absorbing transmission tube isolation clamp which effectuates reduction of transmittance upon structures in communication with a tube being held by the clamp of side to side forces generated by thermal expansion of the tube as the tube transmits liquid under pressure. The clamp comprises a bottom piece which has tube housing to surround one-half of the tube and which tube housing has a vibration absorbing low coefficient of friction material therein. The base of the bottom piece is provided on each side of the tube housing with one or more elongated openings whose long axes are at right angles to the longitudinal axis of the tube housing. The underside of the base is provided with a low coefficient of friction material which, when the clamp is in use, interfaces with the support structure.

The clamp further comprises a top piece having a tube housing to surround one-half of the tube and which housing has a vibration absorbing low coefficient of friction material therein. The top piece is securable to the bottom piece so that when so secured to the bottom piece the tube housing totally surrounds the tube when the tube is situated therein.

In operation a bolt is passed through each elongated opening and further passed through a pre-positioned opening in the support structure to thereafter be secured to hold the bottom piece to the support structure while yet permitting side to side movement along the limits of the elongated openings of the bottom piece on each shaft of each respective bolt holding the bottom piece to the support structure. This side to side movement effectuates reduction of transmittance of side to side forces upon structures in communication with the tube by substantially satisfying these forces at the clamp site instead of transmitting these forces to the site of the structures in communication with the tube. The low coefficient of friction characteristic of the vibration absorbing material within the tube housing substantially satisfies longitudinal movement of the tube, also caused by thermal expansion of the tube, by permitting the tube to move longitudinally as necessary within the tube housing.

DRAWINGS OF A PREFERRED EMBODIMENT

DETAILED DESCRIPTION OF A PREFERRED EMBODIMENT

Figure 1:
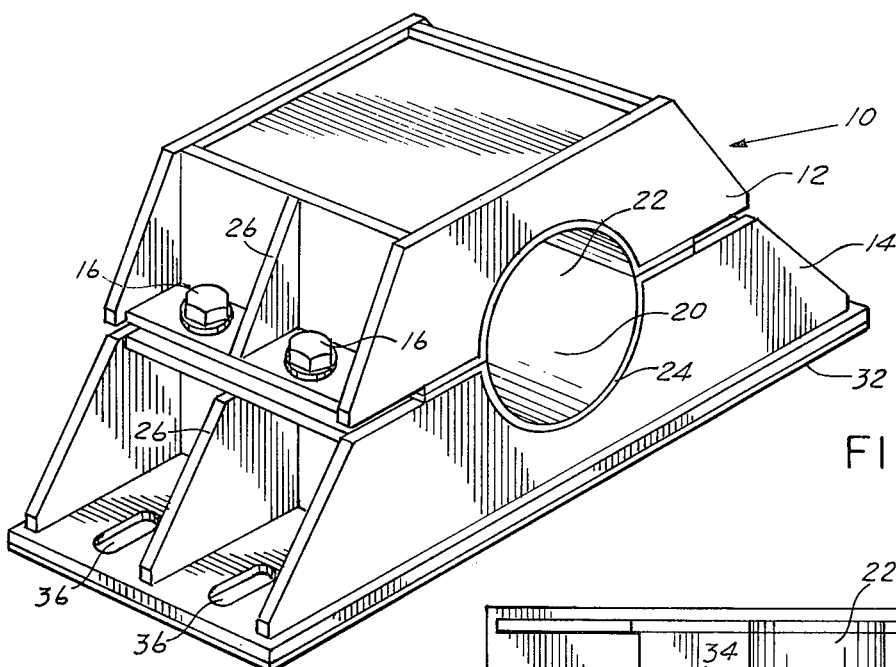
FIG. 1 is a front perspective view of an assembled vibration absorbing transmission tube isolation clamp which effectuates reduction of transmittance upon structures in communication with a tube being held by the clamp of side to side forces generated by thermal expansion of the tube as the tube transmits liquid under pressure.

FIG. 1 is a front perspective view of a clamp 10 having a top piece 12 and a bottom piece 14. The top piece 12 is secured to the bottom piece 14 by means of four threaded high strength iron bolts 16 as known in the art, two on each side, passed through correspondingly situated circular openings of the top piece 12 and bottom piece 14 and tightly secured by metal washers and threaded iron nuts after a transmission tube has been situated in a cylindrical orifice 20 when the clamp 10 is in use. A tube housing 22 results when the top piece 12 and bottom piece 14 are secured to each other, with the top piece 12 and bottom piece 14 each contributing one-half of the housing 22. The top piece 12 and bottom piece 14 each have two support struts 26, with each strut 26 located at right angles to the tube housing 22 midway between the forward and rear walls of each piece 12, 14. These struts 26 are included to provide further structural stability to the clamp 10. Within the housing 22 is a vibration absorbing low coefficient of friction material 24 forming the wall of the cylindrical orifice 20 and entirely filling the housing 22. The vibration absorbing characteristic of the material 24 is utilized to absorb vibration of the tube as the tube transmits a liquid under pressure, thereby reducing vibration which would otherwise be transmitted to the support structure. The low coefficient of friction characteristic of the material 24 substantially satisfies longitudinal tube movement, caused by thermal expansion of the operating tube, by permitting the tube to move longitudinally as necessary within the tube housing 22. In the preferred embodiment the vibration absorbing low coefficient of friction material 24 is molded as known in the art to exactly fit the housing 22 and is structurally rigid 90A durometer hardness urethane. While not required by the urethane identified above, the surface of any other vibration absorbing low coefficient of friction material as may be chosen by one skilled in the art should have, or be provided with as by graphite coating as known in the art, a coefficient of friction equal to or below that of the urethane. In the preferred embodiment a distance of 1/16 inch between the tube wall and the wall of the cylindrical orifice 20 of the tube housing 22 is utilized. Those skilled in the art can determine optimum tolerances depending on the application involved. The body of the clamp 10 in the preferred embodiment is constructed of ⅜ inch thick plate ASTM A-36 steel and may be hot dipped galvanized as known in the art as needed for climate or other environmental conditions. The several plates are welded together as known in the art to thereby construct the clamp 10. The underside of the bottom piece 14 has bonded as known in the art to its entirety a uniformly thick low coefficient of friction base material 32 which interfaces with the support structure when the clamp 10 is secured to the support structure. The base material 32, while bonded to the entirety of the underside in the preferred embodiment, can be bonded to only a portion of the underside so long as the low coefficient of friction effect is maintained at the interface of the support structure and base material 32. The base material 32 should be of a density sufficient to withstand without collapse the pressure exerted thereon during operation and should have a coefficient of friction below what the coefficient of friction would be without the base material 32 at the interface of the underside and the support structure. In the preferred embodiment the base material 32 is Fluorogold, manufactured by The Fluorocarbon Company, Pine Brook, New Jersey, and described in their Spec-Data Sheet No. 5p of May 1974. In the preferred embodiment the thickness of the Fluorogold is ⅛ inch.

Figure 2:
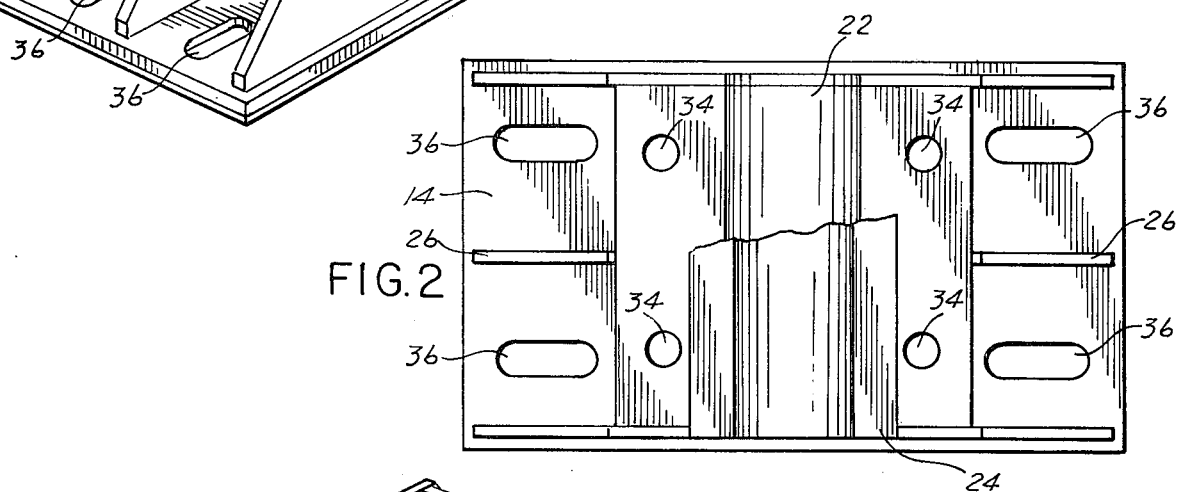
FIG. 2 is a top plan view of the bottom piece of the clamp, showing elongated openings which permit side to side movement of the clamp when the clamp is held by a support structure.

FIG. 2 is a top plan view of the bottom piece 14 of the isolation clamp 10. One-half of the tube housing 22 with vibration absorbing low coefficient of friction material 24 therein is contributed by the bottom piece 14. In FIG. 2 the material 24 is partially cut away. Circular openings 34 accept respective bolts for securing the top piece 12 to the bottom piece 14. In use, the bottom piece 14 is secured to a support structure by respective high strength iron bolts known in the art with one bolt being passed through each elongated opening 36 and further passed through a pre-positioned opening in the support structure to thereafter receive a washer made of vibration absorbing material such as urethane as identified above and a lock washer and a nut, which nut remains in place on the bolt without being tightened against the support structure to thus allow the bottom piece 14 to move from side to side. Utilization of vibration absorbing washers referred to above is known in the art to reduce transmittance of vibration to the support structure.

In use, a transmission tube transmitting a liquid under pressure is subjected to side to side forces generated by thermal expansion of the tube as the tube heats due to transmission therein of liquid under pressure. These side to side forces are substantially satisfied at the clamp site when the bottom piece 14 moves with the tube from side to side along the confines of the elongated openings 36 traveling on the bolts securing the bottom piece to the support structure, thereby reducing transmittance of these side to side forces upon structures in communication with the tube. Such structures in communication with the tube include compressors driving the liquid transmitted in the tube and bolts holding clamps to a support structure. The low coefficient of friction characteristic of the base material 32 acts, of course, to enhance the side to side movement of the clamp 10 holding the tube.

Figure 3:
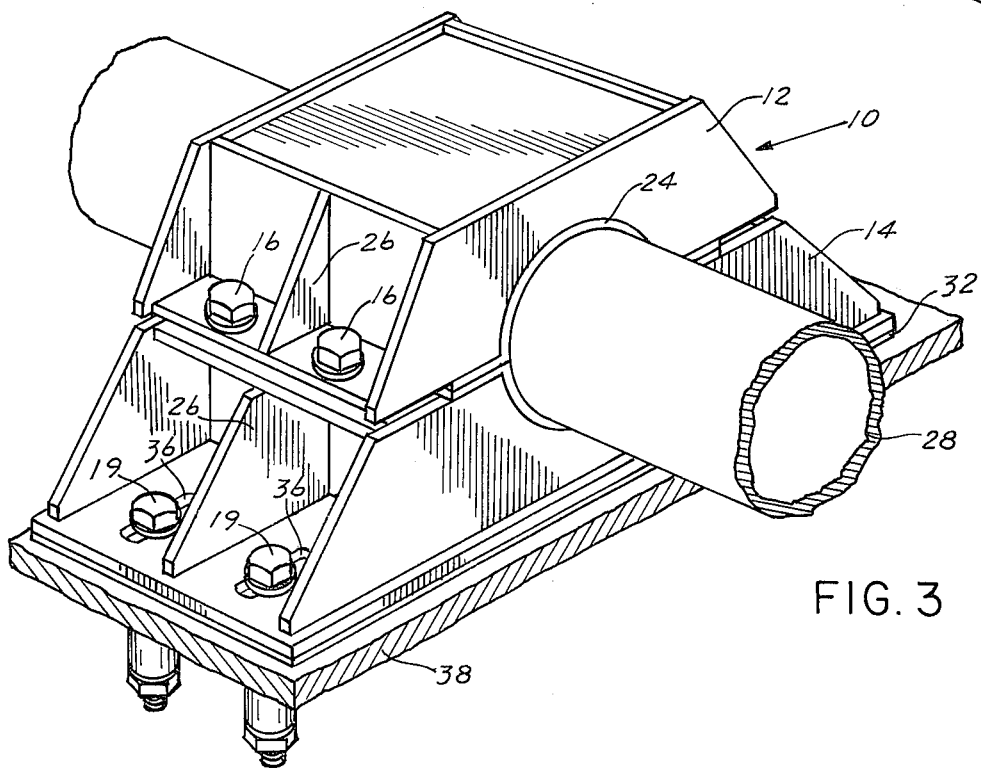
FIG. 3 is a front perspective view of the assembled clamp secured to a support structure and holding a tube therein.

FIG. 3 is a front perspective view of the assembled clamp 10 secured to a support structure 38 and with a transmission tube 28 being held. Bolts 16 secure the top piece 12 to the bottom piece 14. Bolts 19 of the same characteristics as the bolts 16 secure the bottom piece 14 to the support structure 38. As liquid under pressure flows through the tube 28 creating thermal expansion of the tube and consequent side to side forces, the clamp 10 holding the tube 28 moves from side to side along each shaft of each respective bolt 19 within the limits of the elongated openings 36 to thereby substantially satisfy and thus reduce transmittance of these forces to structures in communication with the tube.

I claim:
1. A vibration absorbing transmission tube isolation clamp which effectuates reduction of transmittance upon structures in communication with a tube being held by the clamp of side to side forces generated by thermal expansion of the tube as the tube transmits liquid under pressure, the clamp comprising:
 a. a bottom piece which has tube housing to surround one-half of a transmission tube and which housing has a vibration absorbing low coefficient of friction material therein, and with the base of the bottom piece being provided on each side of the tube housing with one or more elongated openings whose long axes are at right angles to and lateral to the longitudinal axis of the tube housing and further with the base having its underside provided with a low coefficient of friction material situated to interface with the support structure when the clamp is in use; and
 b. a top piece having a tube housing to surround one-half of the transmission tube and which housing has a vibration absorbing low coefficient of friction material therein, with the top piece securable to the bottom piece so that when so secured to the bottom piece the tube housing contributed by the bottom piece and the top piece together totally surround the transmission tube when the transmission tube is situated between the top piece and the bottom piece.

2. A vibration absorbing transmission tube isolation clamp as claimed in claim 1 wherein the bottom piece has two elongated openings on each side of the tube housing and are situated one behind the other in the direction of the longitudinal axis of the tube housing.

3. A vibration absorbing transmission tube isolation clamp as claimed in claim 1 wherein the low coefficient of friction material provided to the underside of the base of the bottom piece is bonded thereon.

4. A vibration absorbing transmission tube isolation clamp as claimed in claim 3 wherein the low coefficient of friction material is provided to the entirety of the underside of the base of the bottom piece.

5. A vibration absorbing transmission tube isolation clamp as claimed in claim 1 wherein the vibration absorbing low coefficient of friction material within the tube housing is molded to exactly fit the tube housing.

* * * * *